US007650240B2

(12) United States Patent
Welty

(10) Patent No.: US 7,650,240 B2
(45) Date of Patent: Jan. 19, 2010

(54) ESTIMATING AN ATTRIBUTE VALUE USING SPATIAL INTERPOLATION AND MASKING ZONES

(75) Inventor: Jeffrey J Welty, Tacoma, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 110 days.

(21) Appl. No.: 11/767,039

(22) Filed: Jun. 22, 2007

(65) Prior Publication Data
US 2008/0319672 A1 Dec. 25, 2008

(51) Int. Cl.
*G01V 3/38* (2006.01)
(52) U.S. Cl. .......................................................... 702/5
(58) Field of Classification Search ........................ 702/5
See application file for complete search history.

(56) References Cited

U.S. PATENT DOCUMENTS

| | | | |
|---|---|---|---|
| 7,046,841 B1 * | 5/2006 | Dow et al. | 382/154 |
| 7,191,066 B1 * | 3/2007 | Rahmes et al. | 702/5 |
| 2003/0048430 A1 * | 3/2003 | Morcom | 356/5.01 |
| 2004/0130702 A1 * | 7/2004 | Jupp et al. | 356/5.01 |
| 2004/0179699 A1 | 9/2004 | Moeller | |

OTHER PUBLICATIONS

Bergamaschi L, "Geostatistics in Hydrology: Kriging interpolation," Course materials 2005-2006, Applied Statistics, dmsa.unipd.it/~berga/Teaching/STAM/stat.pdf.
Lloyd CD, "Scale and the spatial structure of landform: optimizing sampling strategies with geostatistics," *Proc of the 3$^{rd}$ Intl Conf on GeoComputation*, University of Bristol (1998).
Todini E, "Influence of parameter estimation uncertainty in Kriging," *Hydrology & Earth Sys Sci* 5(2) p. 215-223 (2001).

* cited by examiner

*Primary Examiner*—Aditya Bhat
(74) *Attorney, Agent, or Firm*—Christensen O'Connor Johnson Kindness PLLC

(57) ABSTRACT

Aspects of the present invention are directed at estimating the value of an attribute at a specified geographic location. In one embodiment, a method is provided that estimates the elevation at a principal point using LiDAR data that was collected from spatially related secondary points. More specifically, the method includes identifying secondary points where sample attribute data was obtained that are within a predetermined distance to the principal point where the attribute is being estimated. A secondary point may be selected and allocated a masking zone and a determination made regarding whether one or more distant secondary points are within the area of the masking zone. In this regard, more distant secondary points that are inside a masking zone may be assigned less relevance when estimating the value of the attribute.

20 Claims, 4 Drawing Sheets

ESTIMATING AN ATTRIBUTE VALUE USING SPATIAL INTERPOLATION AND MASKING ZONES

BACKGROUND

Advancements in airborne and satellite laser scanning technology provide an opportunity to obtain more accurate information about target locations on the ground. In this regard, Light Detection and Ranging ("LiDAR") is an optical remote scanning technology used to identify distances to remote targets. For example, a laser pulse may be transmitted from a source location, such as an aircraft or satellite, to a target location on the ground. The distance to the target location may be quantified by measuring the time delay between transmission of the pulse and receipt of one or more reflected return signals. Moreover, the intensity of a reflected return signal may provide information about the attributes of the target. In this regard, targets on the ground will reflect return signals with varying amounts of intensity that depends on a number of different factors.

LiDAR optical remote scanning technology has aspects that make it well-suited for identifying attributes of target locations. For example, the wavelengths of a LiDAR laser pulse are typically produced in the ultraviolet, visible, or near infrared areas of the electromagnetic spectrum. These short wavelengths are very accurate in identifying the geographic location of targets that generate a return signal, such as vegetation. Also, LiDAR offers the ability to perform high sampling intensity, extensive aerial coverage, as well as the ability to penetrate the top layer of a vegetation canopy.

Those skilled in the art and others will recognize that LiDAR optical remote scanning technology may be used to obtain a sample set of information about targets on the ground. Typically LiDAR pulses are transmitted from a source location over a regularly spaced pattern. Thus, LiDAR technology may only be used to obtain definitive elevation information about a sample set of ground locations that are along the regularly spaced pattern. It would be beneficial to have a system that is capable of processing LiDAR data and accurately estimating the elevation of ground locations that are not contacted with a LiDAR laser pulse or other attribute that was not directly measured by LiDAR instrumentation.

Some existing systems use a technique known as spatial interpolation to predict the value of an attribute at an unknown point, such as the point's elevation, based on one or more sample point values. Typically, when applying spatial interpolation techniques to perform geographic estimates, a transformation is performed between information measured at scattered points to grids that are suitable for modeling and visualization. Using a grid, the elevation of a grid element may be predicted based on sample point values. In this regard, spatial interpolation is used to estimate a value of a variable at an unsampled location from data obtained from spatially related locations. Spatial interpolation is based on the principal of spatial dependence which measures the degree of dependence between near and distant points. However, transforming sample data onto a grid when performing spatial interpolation is algorithmically complex and a resource intensive task. In this regard, a long-standing need exists to perform spatial interpolation in a way that minimizes the performance impact of estimating attributes at a geographic point based on one or more sample point values.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed to estimating the value of an attribute at a specified geographic location. In one embodiment, a method is provided that estimates the elevation at a principal point using LiDAR data that was collected from spatially related secondary points. More specifically, the method includes identifying secondary points where sample attribute data was obtained that are within a predetermined distance to the principal point where the attribute is being estimated. A secondary point may be selected and allocated a masking zone and a determination made regarding whether one or more distant secondary points are within the area of the masking zone. In this regard, more distant secondary points that are inside a masking zone may be discarded or assigned less relevance when estimating the value of the attribute.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
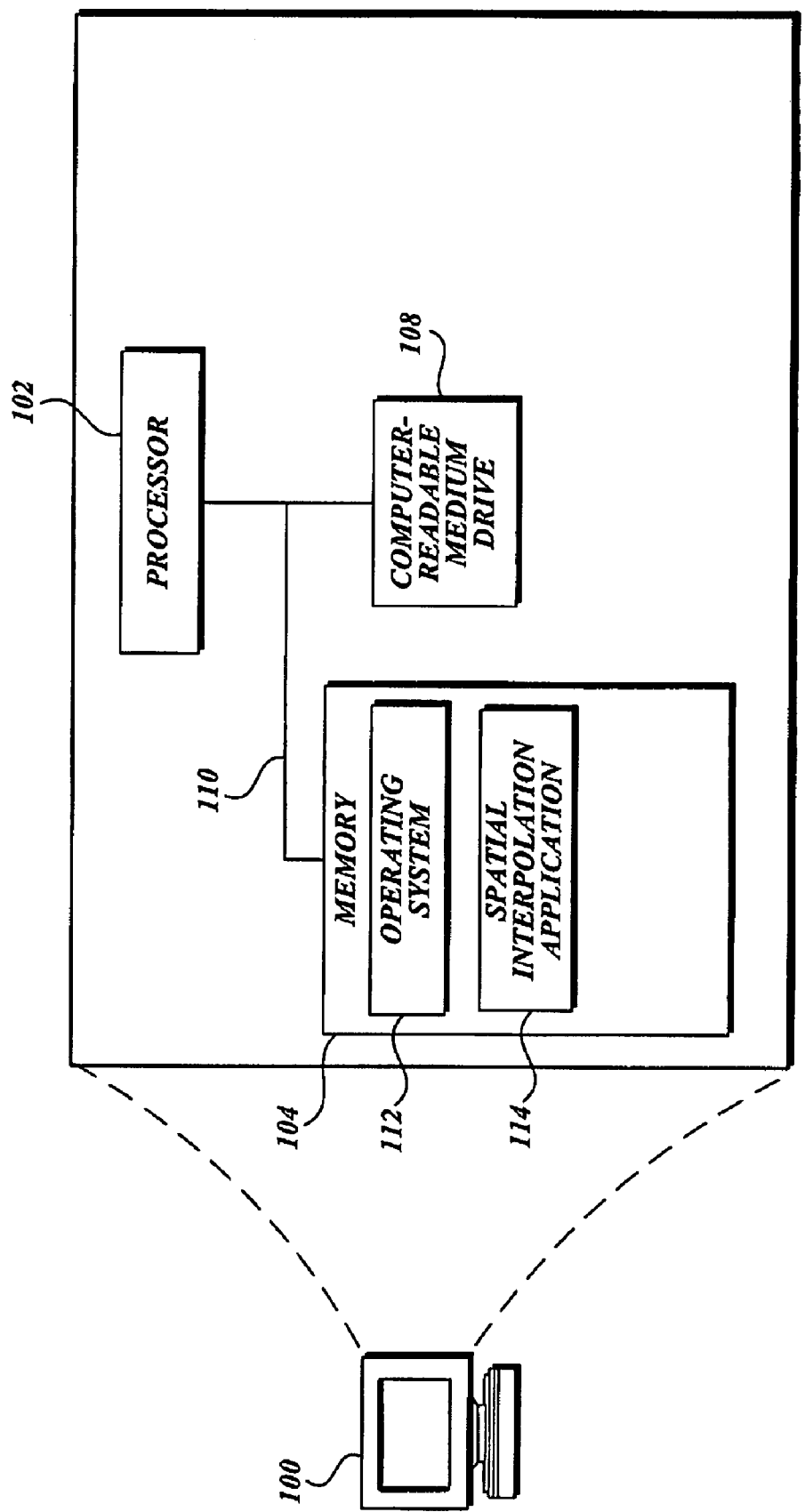
FIG. 1 depicts components of a computer that may be used to implement aspects of the present invention.

Prior to discussing the details of the invention, it should be understood that the following description is presented largely in terms of logic and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

While the present invention will primarily be described in the context of using LiDAR data to estimate the elevation at a geographic point, those skilled in the relevant art and others will recognize that the present invention is also applicable in other contexts. For example, aspects of the present invention may be implemented using other types of data collection systems other than LiDAR to obtain the sample data. In any event, the following description first provides a general overview of a computer system in which aspects of the present invention may be implemented. Then, a method for estimating the value of an attribute at a specified geographic location using LiDAR data that does not directly measure the attribute will be described. The illustrative examples provided herein are not intended to be exhaustive or to limit the invention to the precise forms disclosed. Similarly, any steps described herein may be interchangeable with other steps, or a combination of steps, in order to achieve the same result.

Now with reference to FIG. 1, an exemplary computer 100 with components that are capable of implementing aspects of the present invention will be described. Those skilled in the art and others will recognize that the computer 100 may be any one of a variety of devices including, but not limited to, personal computing devices, server-based computing devices, mini and mainframe computers, laptops, or other electronic devices having some type of memory. For ease of illustration and because it is not important for an understanding of the present invention, FIG. 1 does not show the typical components of many computers, such as a keyboard, a mouse, a printer, a display, etc. However, the computer 100 depicted in FIG. 1 includes a processor 102, a memory 104, a computer-readable medium drive 108 (e.g., disk drive, a hard drive, CD-ROM/DVD-ROM, etc.), that are all communicatively connected to each other by a communication bus 110. The memory 104 generally comprises Random Access Memory ("RAM"), Read-Only Memory ("ROM"), flash memory, and the like.

As illustrated in FIG. 1, the memory 104 stores an operating system 112 for controlling the general operation of the computer 100. The operating system 112 may be a general purpose operating system, such as a Microsoft® operating system, a Linux® operating system, or a UNIX® operating system. Alternatively, the operating system 112 may be a special purpose operating system designed for non-generic hardware. In any event, those skilled in the art and others will recognize that the operating system 112 controls the operation of the computer by, among other things, managing access to the hardware resources and input devices. For example, the operating system 112 performs functions that allow a program to read data from the computer-readable media drive 108. In this regard, LiDAR data may be made available to the computer 100 from the computer-readable media drive 108. Accordingly, a program installed on the computer 100 may interact with the operating system 112 to access LiDAR data from the computer-readable media drive 108.

As further depicted in FIG. 1, the memory 104 additionally stores program code and data that provides a spatial interpolation application 114. In one embodiment, the spatial interpolation application 114 comprises computer-executable instructions that, when executed by the processor 102, estimates the value of an attribute at a geographic point based on sample data from one or more spatially related points. For example, the spatial interpolation application 114 may be used to predict the elevation at a location from data obtained at nearby points. By way of another example, the spatial interpolation application 114 may be used to predict the intensity of a return signal at a location that was not contacted with a LiDAR pulse. Accordingly, aspects of the present invention perform processing to predict the value of an attribute that was not measured directly. In this regard, an exemplary embodiment of a routine implemented by the spatial interpolation application 114 that performs a calculation to estimate the value of an attribute is described below with reference to FIG. 2.

FIG. 1 depicts an exemplary architecture for the computer 100 with components that may be used to implement one or more embodiments of the present invention. Of course, those skilled in the art and others will appreciate that the computer 100 may include fewer or more components than those shown in FIG. 1. Moreover, those skilled in the art will recognize that a specific computer configuration and examples have been described above with reference to FIG. 1. However, these specific examples should be construed as illustrative in nature, as aspects of the present invention may be implemented in other contexts without departing from the scope of the claimed subject matter.

Now with reference to FIG. 2, an exemplary interpolation routine 200 that predicts the value of an attribute at a geographic point will be described. For example, the interpolation routine 200 may be used to predict the elevation at a point that is spatially related to other points in which LiDAR data was obtained. As mentioned previously, LiDAR is an optical remote scanning technology that may be used to identify distances to remote targets. In this regard, a series of laser pulses may be transmitted from an aircraft, satellite, or other source location to target locations on the ground. Some of the laser pulses may contact vegetation (leaves, branches, etc.), while others contact the ground below the vegetation canopy. In accordance with one embodiment, the interpolation routine 200 may be used to estimate the elevation of the ground at a geographic point where a LiDAR pulse contacted vegetation. In this way, aspects of the present invention may be used to identify elevation information so that the height of an item of vegetation may be readily identified. However, aspects of the interpolation routine 200 may be used to estimate other attributes that were not measured directly in other contexts without departing from the scope of the claimed subject matter.

Figure 2:
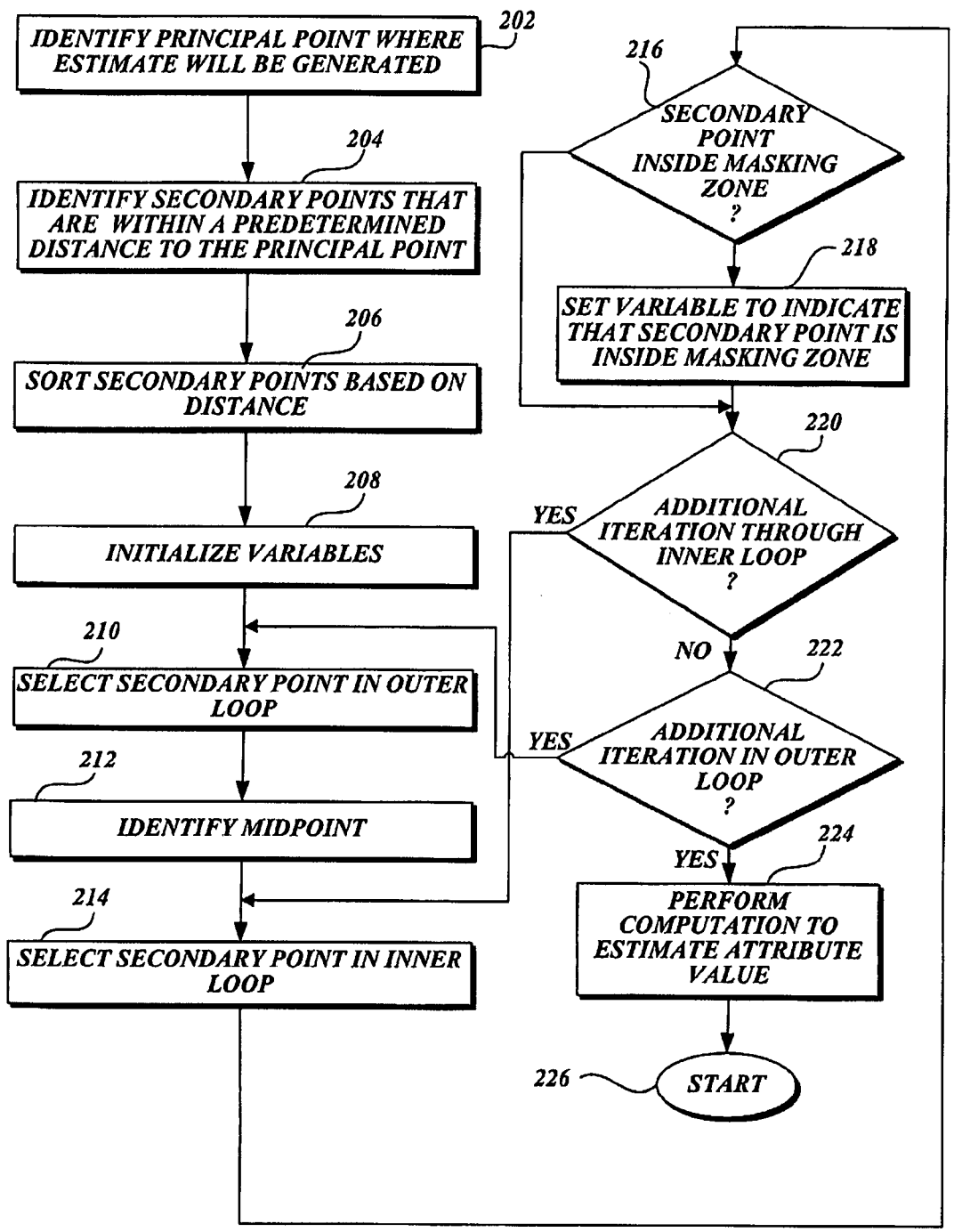
FIG. 2 depicts an exemplary interpolation routine for predicting the value of an attribute that was not measured directly in accordance with one embodiment of the present invention.

As illustrated in FIG. 2, at block 202 a principal point in which an attribute will be estimated is identified by the interpolation routine 200. In one embodiment, an attribute at a principal point, such as the elevation of the point, is estimated based on the point's spatial relationship to secondary points in which the attribute value is known. In this regard, those skilled in the art and others will recognize that spatial interpolation techniques quantify the degree of dependence between distant points for the purpose of performing an estimate.

As further illustrated in FIG. 2, at block 204, secondary points that may be used to estimate the value of an attribute are identified. More specifically, secondary points where sample data was obtained that are within a predetermined distance to a principal point are identified. In the context of estimating an elevation, points that generated a return signal with an elevation consistent with contacting the ground below a vegetation canopy are identified, at block 204. Then, at block 206, secondary points that are within the predetermined distance to the principal point are sorted based on distance. In this regard, the secondary point identified as being the closest to the principal point is placed in the first position in the sorted data. Moreover, the secondary point that is the farthest from the principal point is placed in the last position in the sorted data.

As further illustrated in FIG. 2, at block 208, variables are initialized that will be used to estimate the value of an attribute that is unknown. As described in further detail below, a weighted mean approach in which certain data elements are assigned more weight or significance may be used by aspects of the present invention to perform the estimate. In one embodiment, secondary points in which LiDAR data has been obtained and the elevation is known are used to estimate the elevation at a principal point in which the elevation is unknown. Elevation information associated with secondary points are given differing amounts of significance when performing the estimate. In accordance with one embodiment, variables that will be used to calculate the weighted mean are initialized at block 208 and dynamically updated as the interpolation routine 200 executes. For example, a variable initialized at block 208 will store a summation of the distances between the principal and the secondary points.

At block 210, a secondary point is selected from which sample data was obtained on an iteration through an outer loop. In accordance with one embodiment, points sorted at block 206 are sequentially selected on an iteration of an outer loop based on distance. In this regard, when block 210 is initially reached, the closest secondary point to the principal point is selected. As described in further detail below, a masking zone may be associated with the selected secondary point that may be used to "mask-out" or discard less relevant secondary points. Moreover, when a secondary point is selected, at block 210, certain administrative tasks are performed. For example, the summation of distance between the principal and secondary points is also updated at block 210.

Figure 3:
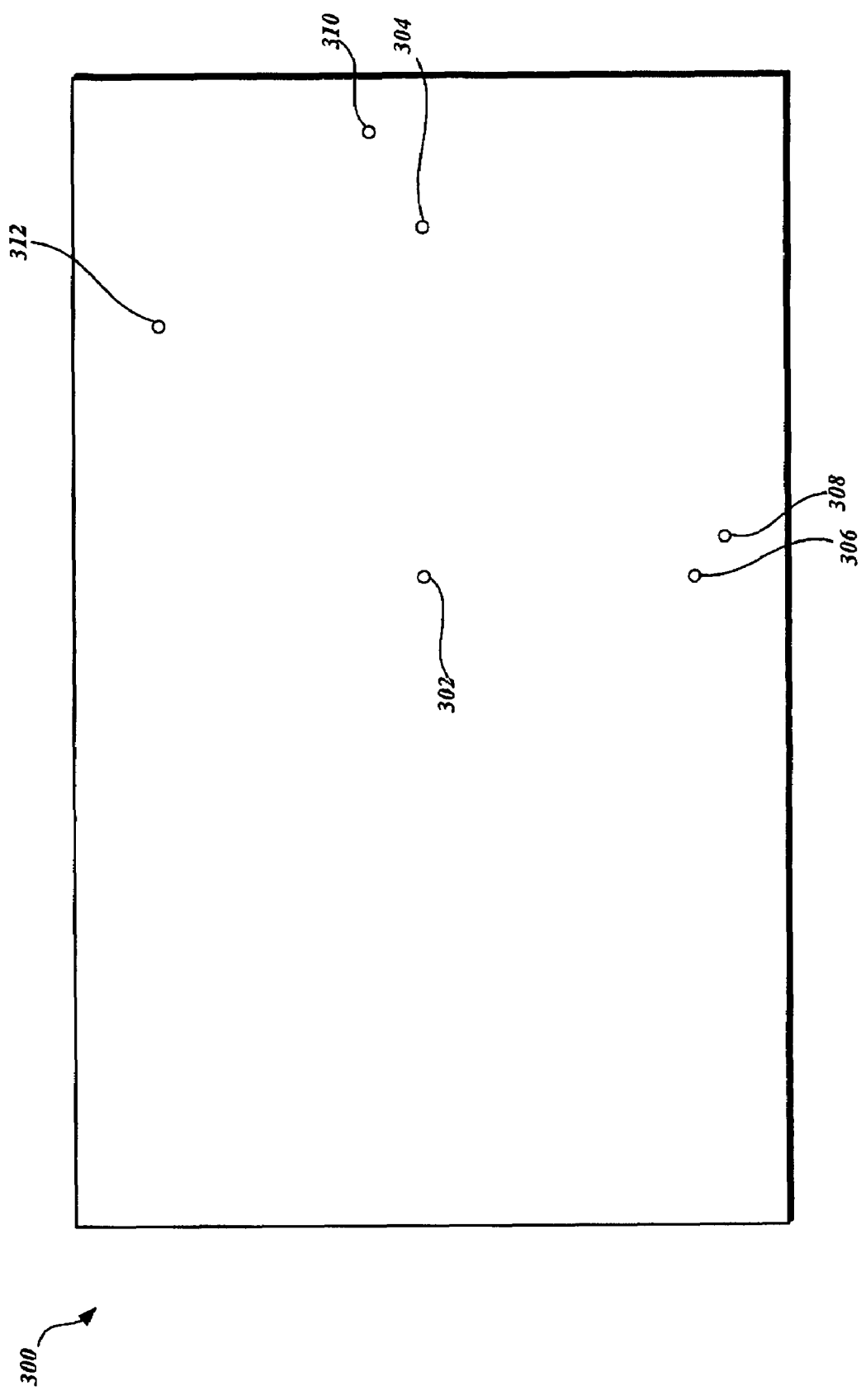
FIG. 3 depicts an exemplary map with principal and secondary points that may be used to illustrate aspects of the present invention.

For illustrative purposes and by way of example only, an exemplary map 300 with attributes that may be used to describe aspects of the present invention is depicted in FIG. 3. The exemplary map 300 illustrates a landscape in which the elevation at different geographic locations may vary. Accordingly, the map 300 depicted in FIG. 3 includes the principal point 302. In this regard, the elevation at the principal point 302 may be estimated by the interpolation routine 200 based on elevation information obtained from other, spatially related, geographic locations. To this end, the map 300 also includes a set of secondary points 304, 306, 308, 310, and 312 from which sample data has been obtained using LiDAR instrumentation.

The interpolation routine 200 may perform processing to estimate the elevation at the principal point 302. In this regard, the secondary points 304-312 may be sequentially selected and analyzed by the interpolation routine 200. As mentioned previously, aspects of the present invention select the secondary points 304-312 based on distance from closest to farthest. For example, the secondary point 304 may be initially selected at block 210 (FIG. 2) on an outer loop of execution that is implemented by the interpolation routine 200. As described in further detail below, the secondary point 304 may be allocated a masking zone. In this instance and in accordance with one embodiment, the more distant secondary points 306-312 may be "masked off" or discarded if they are within the masking zone that is allocated to the secondary point 304. In this way, aspects of the present invention use the most relevant points when estimating the value of an attribute. In accordance with another embodiment, secondary points that are inside a masking zone are not discarded altogether but assigned less significance than other secondary points.

Returning to FIG. 2, at block 212 of the interpolation routine 200, a midpoint between a principal point in which an attribute is being estimated and the secondary point selected at block 210 is calculated. As described in detail below, the midpoint identified by the interpolation routine, at block 212, will serve as the vertex for a masking zone that is created by aspects of the present invention. In any event, the midpoint is calculated at block 212 using mathematical functions and computational techniques that are generally known in the art.

At block 214, the interpolation routine 200 iterates through an inner loop to select the next closest secondary point in the secondary points sorted at block 208. Generally described, on the outer loop implemented by the interpolation routine 200, secondary points are selected and allocated a masking zone. Then, on the inner loop, more distant secondary points are sequentially selected. For each of the more distant secondary points selected on the inner loop, a comparison is performed to determine whether the point is inside the area allocated to the masking zone. More specifically, at decision block 216, a determination is made regarding whether the secondary point selected at block 214 is inside the area of a masking zone. In this regard, the angle between the midpoint identified a block 212 and the secondary point selected at 214 is calculated using a mathematical function. For example, the angle between the midpoint and a secondary point may be calculated using the mathematical formula shown below in Formula 1.

$$\cos\varphi = \frac{u \cdot v}{|u||v|} \qquad \text{Formula 1}$$

wherein:
u=the vector from the principal point to the midpoint
v=the vector from the midpoint to the secondary point that is allocated the masking zone In accordance with one embodiment, if the angle between the midpoint and the secondary point selected at block 214 is greater than 45°, then a determination is made that the secondary point is not in the current masking zone. While the interpolation routine 200 is described above as employing a masking zone that extends outward from a midpoint at a 45° angle, a masking zone may be created that has different attributes than those described above. If a determination is made at block 216 that the secondary point selected on the inner loop is not inside the current masking zone, the interpolation routine 200 proceeds to block 220, described below. In this instance, the secondary point selected on the inner loop is still available to be used when estimating the value of the attribute. Conversely, if a determination is made at block 216 that the point selected at block 214 is inside the current masking zone, the interpolation routine 200 proceeds to block 218. Then, at block 218, a variable is set that indicates the secondary point selected at block 214 is inside a masking zone allocated to a more relevant secondary point. In one embodiment, if block 218 is reached, the point selected at block 214 is not used to estimate the value of an attribute at a principal point. In an alternative embodiment, a secondary point that is inside a masking zone is allocated less significance than other points rather than being discarded altogether.

Figure 4:
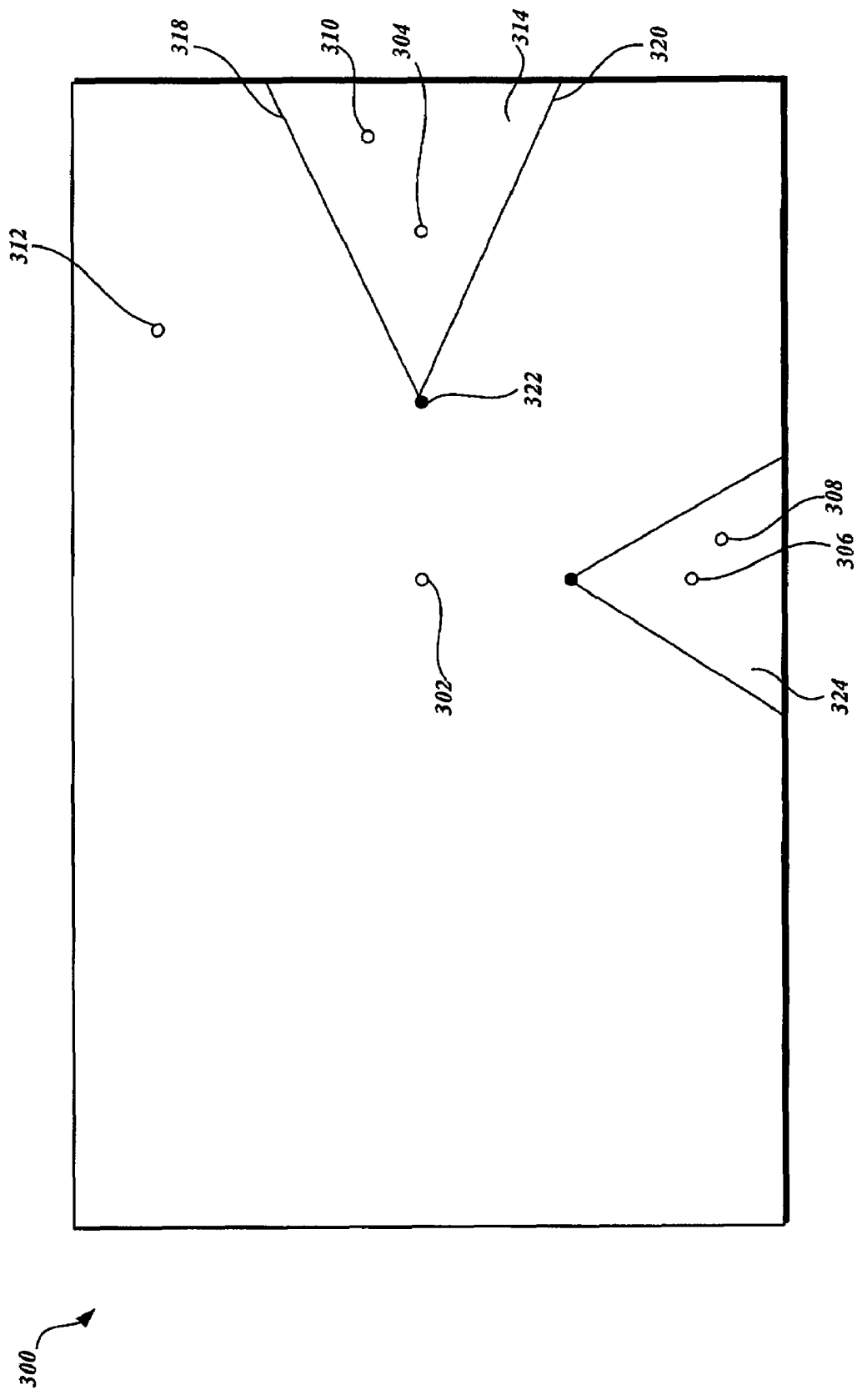
FIG. 4 depicts the map of FIG. 3 with additional attributes that may be used to illustrate aspects of the present invention.

For illustrative purposes and by way of example only, the exemplary map 300 described above with reference to FIG. 3 is also depicted in FIG. 4. Similar to the description above, the map 300 includes the principal point 302 and the secondary points 304-312. Also depicted in FIG. 4 is a masking zone 314 that is associated with the secondary point 304. As described above, the interpolation routine 200 (FIG. 2) initially selects the closest secondary point 304 and determines whether other, more distant, secondary points are inside the masking zone 314. More specifically and in accordance with one embodiment, the interpolation routine 200 selects a secondary point 304 on an initial iteration through the outer loop to determine whether any of the secondary points 306-312 are inside an area defined by the lines 318 and 320 that extend outward from the midpoint 322. As described previously, any secondary point that is inside the masking zone 314 may be discarded or assigned less significance when aspects of the present invention estimate the value of an attribute at the principal point 302.

Since the secondary points are selected based on distance, the selection of the secondary point 304 for analysis by the interpolation routine 200 on the outer loop precedes the selection and analysis of other, more distant, secondary points 306-312. In the example depicted in FIG. 4, the secondary point 310 is identified as being within the area of the masking zone 314 that is allocated to the secondary point 304. Then, the secondary point 306 is selected for analysis, and the masking zone 324 is defined. In this instance, the secondary point 308 is identified as being within the area of the masking zone 324. However, the secondary point 312 is not within the area of a masking zone that is allocated to another secondary point.

Now with reference again to FIG. 2, at block 220, a determination is made regarding whether any additional iterations through the inner loop for determining whether, more distant, secondary points are inside the area of a masking zone are necessary. In the example depicted in FIGS. 3 and 4, each of the secondary points 306-312 are selected and a determination is made regarding whether they are within the masking zone 314. In this example, if all of the secondary points 306-312 have not been selected, then the interpolation routine 200 proceeds back to block 214, and blocks 214-220 repeat until the inner loop completes. Once all of the secondary points 306-312 have been selected to determine whether they are within the area allocated to the masking zone 314, the interpolation routine 200 proceeds to block 222, described in further detail below.

As further illustrated in FIG. 2, at block 222, a determination is made regarding whether additional secondary points will be allocated a masking zone. As mentioned above, secondary points within a geographic area are initially sorted based on their distance to a principal point in which an attribute is being estimated. Then, the secondary points are sequentially selected on the outer loop and allocated a masking zone as depicted in FIG. 4. In this regard, the analysis performed by the interpolation routine 200 may identify secondary points that are within the masking zone of other secondary points. Accordingly, once the points 308 and 310 are identified as being within the area of the masking zones 314 and 320, the interpolation routine 200 may not select and perform additional analysis on these points. In any event, if additional secondary points exist that will be allocated a masking zone, the interpolation routine 200 proceeds back to block 210 and blocks 210-222 repeat until all appropriate secondary points have been selected. Conversely, if all of the appropriate secondary points have been selected on the outer loop, the interpolation routine 200 proceeds to block 224.

As further illustrated in FIG. 2, at block 224, a computation is performed to estimate the value of an attribute that is unknown. More specifically and in accordance with one embodiment, the calculation performed at block 224 may use formula 2 provided below to estimate the elevation at a particular point in which an attribute was not measured directly.

$$\text{Estimated value} = \frac{\sum_i V_i * \frac{1}{dist_i^k}}{\sum_j \frac{1}{dist_j^k}} \quad \text{Formula 2}$$

wherein:

$V_i$=the value of the variable at the secondary points $dist_i$=the distance to the secondary points from the principal point k=a supplied weighting parameter usually equal to 1 or 2

Significantly, the computation performed at block 224 applies a weighted mean approach to estimating the value of an attribute at a specified geographic location. In other words, some data elements may be given more weight or significance than other data elements. In this instance, secondary points in which elevation information is known are assigned a variable amount of significance depending on the proximity of a secondary point to a point where the elevation is being estimated. As formula 2 indicates and in accordance with one embodiment, the significance assigned to a secondary point may be inversely proportional to the distance between the principal and secondary point raised to a power. Thus, closer secondary points may be assigned much greater significance than more distant secondary points when performing the estimate.

In accordance with one embodiment, the value that is estimated at block 224 may be the elevation at a location where LiDAR data was collected. For example, LiDAR instrumentation may be used to scan a geographic area. Some of the LiDAR laser pulses may contact vegetation while others contact the ground below a vegetation canopy. In this regard, the calculation performed at block 224 may be used to estimate a ground elevation at a geographic location where a LiDAR pulse contacted vegetation and thus did not measure the elevation of the ground directly. In other words, the LiDAR pulses that contacted the ground below a vegetation canopy may be used as secondary points to predict the elevation at a nearby location. However, those skilled in the art and others will recognize that a different attribute may be estimated using the interpolation routine 200. Then, the interpolation routine 200 proceeds to block 226, where it terminates.

Implementations of the present invention are not limited to the illustrative embodiment of the interpolation routine 200 depicted in FIG. 2. In some instances, additional or fewer steps than those depicted in FIG. 2 may be performed without departing from the scope of the claimed subject matter. Also, those skilled in the art and others will recognize that variations on the steps described above with reference to FIG. 2 may be performed in alternative embodiments of the present invention. Thus, the interpolation routine 200 depicted in FIG. 2 provides just one example of the manner in which an embodiment of the invention may be implemented.

While illustrative embodiments have been illustrated and described, it will be appreciated that various changes can be made therein without departing from the spirit and scope of the invention.

The embodiment of the invention in which an exclusive property or privilege is claimed are defined as follows:

1. A method executed in instructions on a computing device for estimating the value of an attribute at a principal point, the method comprising:

identifying one or more secondary points where sample elevation data of the ground below vegetation canopy was obtained that are within a predetermined distance to the principal point;

sequentially selecting the one or more secondary points identified as being within the predetermined distance to the principal point;

for each secondary point selected:

allocating a masking zone to the selected secondary point, the masking zone defining a geographic area that originates from the selected secondary point, the masking zone being more distant from the principal point than the location of the selected secondary point;

determining whether a more distant secondary point is within the geographic area defined by the masking zone allocated to the selected secondary point;

if the more distant secondary point is inside the geographic area defined by the masking zone, discarding the elevation data associated with the more distant secondary point relative to secondary points that are outside the geographic area defined by the masking zone when estimating the elevation of the ground at the principal point; and calculating an estimate of the elevation at the principal point, the calculation using a weighted mean parameter to assign significance to secondary points that are not inside a masking zone without employing a gap probability function to return signals of LiDAR data having a reflectance value that is above a threshold indicative of ground terrain.

2. The method as recited in claim 1, further comprising assigning significance to secondary points based on the proximity of the secondary points to the principal point.

3. The method as recited in claim 2, wherein the significance assigned to secondary points is inversely proportional to the distance raised to a power between the principal and secondary points.

4. The method as recited in claim 1, wherein the secondary points are geographic locations where a LiDAR return signal from the ground below a vegetation canopy was generated.

5. The method as recited in claim 1, wherein sequentially selecting the one or more secondary points includes maintaining a summation of the distances between the principal point and each selected secondary point.

6. The method as recited in claim 1, wherein the masking zone is an area that extends at a 45° angle from a vertex at the midpoint between the principal and the selected secondary point.

7. The method as recited in claim 1, wherein secondary points inside the masking zone are not assigned any significance when estimating the value of the attribute at the principal point.

8. A computer-readable medium with computer executable components for estimating the elevation at a principal point based on elevation data obtained from one or more spatially-related secondary points, the computer-executable components comprising:

a collection component for obtaining elevation information at secondary points that generate return signals in response to being contacted with a LiDAR laser pulse;

an interpolation component operative to identify and cause the most relevant secondary points to be used when estimating the elevation at the principal point, wherein the interpolation component allocates a masking zone to a first secondary point defining a geographic area that is more distant to the principal point than the first secondary point and determines whether a second secondary point is within the geographic area defined in the masking zone; and a calculation component for calculating an estimate of the elevation at the principal point, wherein if a second secondary point is within the geographic area defined by the masking zone allocated to a first secondary point, the calculation component discards elevation data obtained from the second secondary point when estimating the elevation of the ground below a vegetation canopy at the principal point; and wherein calculating an estimate of the elevation at the principal point includes using a weighted mean parameter to assign significance to secondary points that are not inside a masking zone without applying a gap probability function to return signals of LiDAR data having a reflectance value that is above a threshold indicative of ground terrain.

9. The computer-readable medium as recited in claim 8, wherein the collection component is further configured to identify locations that generated return signals with an elevation that is consistent with contacting the ground.

10. The computer-readable medium as recited in claim 8, wherein the interpolation component is further configured to allocate a masking zone to the secondary points, wherein the masking zone extends at a 45° angle from a vertex at the midpoint between the principal point and the secondary points.

11. The computer-readable medium as recited in claim 8, wherein the interpolation component is further configured to determine whether a more distant secondary point is within the area of the masking zone.

12. The computer-readable medium as recited in claim 8, wherein the significance assigned by the calculation component is inversely proportional to the distance raised to a power between the principal and secondary points.

13. The computer-readable medium as recited in claim 8, wherein the calculation component is configured to estimate the elevation of the return signal at the principal point.

14. A computing device, comprising:

a memory for storing data; and a processing unit communicatively coupled to the memory, wherein the processing unit is operative to:

identify one or more secondary points where sample elevation data of the ground below a vegetation canopy was obtained that are within a predetermined distance to the principal point;

sequentially select one or more secondary points identified as being within the predetermined distance to the principal point;

for each secondary point selected:

allocate a masking zone to the selected secondary point, the masking zone defining a geographic area that originates from the selected secondary point, the masking zone being more distant from the principal point than the location of the selected secondary point;

determine whether a more distant secondary point is inside the geographic area defined by the masking zone allocated to the selected secondary point;

if the more distant secondary point is inside the geographic area defined by the masking zone, discard the elevation data associated with the more distant secondary point relative to secondary points that are outside the geographic area defined by the masking zone when estimating elevation of the ground at the principal point; and calculating an estimate of the elevation at the principal point, the calculation using a weighted mean parameter to assign significance to secondary points that are not inside a masking without employing a gap probability function to return signals of LiDAR data having a reflectance value that is above a threshold indicative of around terrain.

15. The computing device as recited in claim 14, further comprising performing a calculation to estimate the value of the attribute, wherein the calculation assigns significance to secondary points based on the proximity of the secondary points to the principal point.

16. The computing device as recited in claim 15, wherein the significance assigned to secondary points is inversely proportional to the distance raised to a power between the principal and secondary points.

17. The computing device is recited in claim 14, wherein the secondary points are geographic locations where a LiDAR return signal from the ground below a vegetation canopy was generated.

18. The computing device as recited in claim 14, wherein sequentially selecting the one or more secondary points includes maintaining a summation of the distances between the principal point and each selected secondary point.

19. The computing device as recited in claim 14, wherein the masking zone is an area that extends at a 45° angle from a vertex at the midpoint between the principal and the selected secondary point.

20. The computing device as recited in claim 14, wherein the secondary points inside the masking zone are not assigned any significance when estimating the value of the attribute at the principal point.

* * * * *

UNITED STATES PATENT AND TRADEMARK OFFICE
CERTIFICATE OF CORRECTION

PATENT NO. : 7,650,240 B2
APPLICATION NO. : 11/767039
DATED : January 19, 2010
INVENTOR(S) : Jeffrey J. Welty It is certified that error appears in the above-identified patent and that said Letters Patent is hereby corrected as shown below:

Col. 10, Line 56, should read as follows:

... inside a masking zone without employinng a gap probability ...

Col. 11, Line 3, should read as follows:

... 17. The computing device as recited in claim 14, wherein ...

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,650,240 B2 | Page 1 of 1 |
| APPLICATION NO. | : 11/767039 | |
| DATED | : January 19, 2010 | |
| INVENTOR(S) | : Jeffrey J. Welty | |

It is certified that error appears in the above-identified patent and that said Letters Patent is hereby corrected as shown below:

Col. 10, Line 56, should read as follows:

... inside a masking zone without employing a gap probability ...

Col. 11, Line 3, should read as follows:

... 17. The computing device as recited in claim 14, wherein ...

This certificate supersedes the Certificate of Correction issued April 20, 2010.

Signed and Sealed this

Eighth Day of June, 2010

David J. Kappos
*Director of the United States Patent and Trademark Office*